United States Patent
Harada

(10) Patent No.: US 8,064,103 B2
(45) Date of Patent: Nov. 22, 2011

(54) INFORMATION PROCESSING APPARATUS AND METHOD

(75) Inventor: Koji Harada, Yokohama-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 683 days.

(21) Appl. No.: 12/241,510

(22) Filed: Sep. 30, 2008

(65) Prior Publication Data

US 2009/0097075 A1    Apr. 16, 2009

(30) Foreign Application Priority Data

Oct. 10, 2007    (JP) .................................. 2007-264970

(51) Int. Cl.
  *H04N 1/403*    (2006.01)
  *H04N 1/40*    (2006.01)
  *H04N 1/405*    (2006.01)
  *H04N 1/46*    (2006.01)
  *G03F 3/08*    (2006.01)
  *G06K 9/00*    (2006.01)

(52) U.S. Cl. ..................... 358/3.28; 358/3.13; 358/2.99; 358/521; 358/539; 382/100

(58) Field of Classification Search ........................ None
See application file for complete search history.

(56) References Cited

U.S. PATENT DOCUMENTS

| 7,227,661 B2 | 6/2007 | Matsunoshita | |
|---|---|---|---|
| 7,356,160 B2 * | 4/2008 | Shibaki et al. | 382/100 |
| 7,613,317 B2 * | 11/2009 | Lu | 382/100 |

FOREIGN PATENT DOCUMENTS

| JP | 07-231384 | 8/1995 |
|---|---|---|
| JP | 2004-221773 | 8/2004 |
| JP | 3879552 | 2/2007 |

* cited by examiner

*Primary Examiner* — Twyler Haskins
*Assistant Examiner* — Barbara Reinier
(74) *Attorney, Agent, or Firm* — Cowan, Liebowitz & Latman, P.C.

(57) ABSTRACT

An information embedding apparatus (200) which embeds information in each character in an original document includes an extraction unit (202) which extracts the circumscribed rectangles of characters from the original document, a selection unit (203) which selects, based on a predetermined condition, a character in which information is to be embedded, from the characters included in the respective circumscribed rectangles, an information embedding unit (204) which embeds information in a character selected by the selection unit (203) as the character in which information is to be embedded, a character generation unit (205) which generates a character not selected by the selection unit (203) at a lower pixel density per unit area than that of the character in which the information embedding unit (204) embeds the information, and an output unit (206) which outputs the original document processed by the information embedding unit (204) and the character generation unit (205).

11 Claims, 11 Drawing Sheets

INFORMATION PROCESSING APPARATUS AND METHOD

BACKGROUND OF THE INVENTION

1. Field of the Invention

The present invention relates to a technique of embedding information in a document and a technique of extracting embedded information.

2. Description of the Related Art

These days, it is very easy to copy, using a copying machine or the like, a document created by another person. Even a document which inhibits copying without permission, such as a document (to be simply referred to as a confidential document hereinafter) describing confidential matters, is highly likely to be easily copied. For example, when confidential information described in a confidential document is output as a printed material, the printed material is often copied. To prevent this, there have been proposed a variety of techniques for inhibiting arbitrary and intended copying operations or restricting them to a predetermined range.

Japanese Patent Laid-Open No. 7-231384 (reference 1) discloses a technique of generating a pattern image by image processing to obtain the same effects as those of copy forgery-inhibited paper. The copy forgery-inhibited paper has a special pattern image printed in advance. The pattern image is, for example, a hidden word of warning which is hardly seen by the human eye, but appears when copied by a copying machine. If a copying machine copies a document printed on copy forgery-inhibited paper, a word of warning such as "copy protected" appears conspicuously in the copy. Such a word of warning psychologically deters the user from illicit copying, and can distinguish a copy from the original. Reference 1 also discloses a technique of superposing the images of a warning word and background having undergone different dither processes at a specific common density, thereby compositing input image data and a pattern image capable of obtaining the same effect as that of copy forgery-inhibited paper.

Japanese Patent No. 3879552 (reference 2) discloses a technique of embedding mechanically readable copy protection information in a confidential document in advance, detecting it from an image read by a copying machine, and controlling the copying operation of the copying machine based on the detection result.

Japanese Patent Laid-Open No. 2004-221773 (reference 3) discloses a technique of creating an original by generating, with small independent dots, characters selected by the user from a document. When the original is copied, the characters disappear.

However, according to reference 1, when a copying machine copies a document, a word of warning appears in the background of the copy to psychologically deter the user from illicit copying. However, this is merely a deterrent effect, and cannot prevent illicit copying.

According to reference 2, it can be controlled to inhibit an image reading apparatus such as a copying machine from copying. However, the user can easily copy with popular image reading apparatuses which do not comply with the invention of reference 2. That is, if the user knows this fact and intentionally copies with a copying machine which does not comply with the invention, he can easily get a copy.

According to reference 3, when an original is copied, characters generated with small independent dots always disappear. Hence, even when the user legally copies, he cannot accurately reproduce the original, resulting in inconvenience. Every time the user creates an original, he needs to select characters to be generated with small independent dots. This puts a heavy burden on the user.

SUMMARY OF THE INVENTION

It is an object of the present invention to more reliably prevent illicit copying and allow accurate, easy copying of a document for legal copying.

According to one aspect of the present invention, there is provided an information processing apparatus which embeds information in each character in an original document, the apparatus comprises: extraction means for extracting circumscribed rectangles of characters from the original document; selection means for selecting, based on a predetermined condition, a character in which information is to be embedded, from the characters included in the respective circumscribed rectangles; information embedding means for embedding information in a character selected by the selection means as the character in which information is to be embedded; character generation means for generating a character not selected by the selection means at a lower pixel density per unit area than a pixel density of the character in which the information embedding means embeds the information; and output means for outputting the original document processed by the information embedding means and the character generation means.

According to another aspect of the present invention, there is provided an information processing method of embedding information in each character in an original document, the method comprises: an extraction step of extracting circumscribed rectangles of characters from the original document; a selection step of selecting, based on a predetermined condition, a character in which information is to be embedded, from the characters included in the respective circumscribed rectangles; an information embedding step of embedding information in a character selected in the selection step as the character in which information is to be embedded; a character generation step of generating a character not selected in the selection step at a lower pixel density per unit area than a pixel density of the character in which the information is embedded; and an output step of outputting the original document processed in the information embedding step or the character generation step.

The present invention can more reliably prevent illicit copying, and allows accurate, easy copying of a document for legal copying.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will be described in detail below with reference to the accompanying drawings.

First Embodiment

Figure 1:
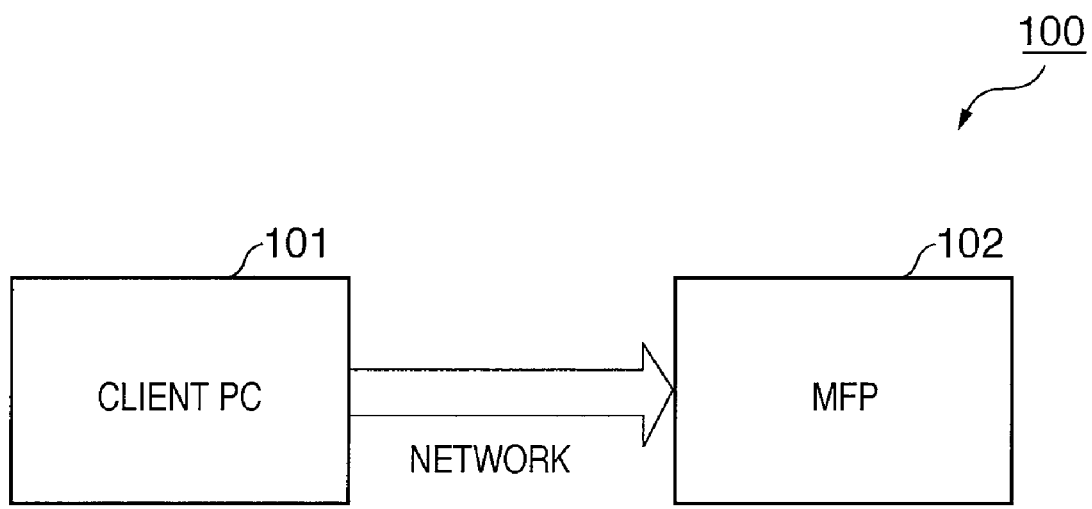
FIG. 1 is a block diagram showing the arrangement of an information processing apparatus 100 according to the first embodiment of the present invention.

FIG. 1 is a block diagram showing the arrangement of an information processing apparatus 100 according to the first embodiment of the present invention. The information processing apparatus 100 comprises a client personal computer (to be referred to as a PC hereinafter) 101, and an MFP (Multi Function Peripheral) 102. The PC 101 and MFP 102 are connected to a network such as a LAN, and can exchange data such as an image, and protocol commands.

Figure 2:
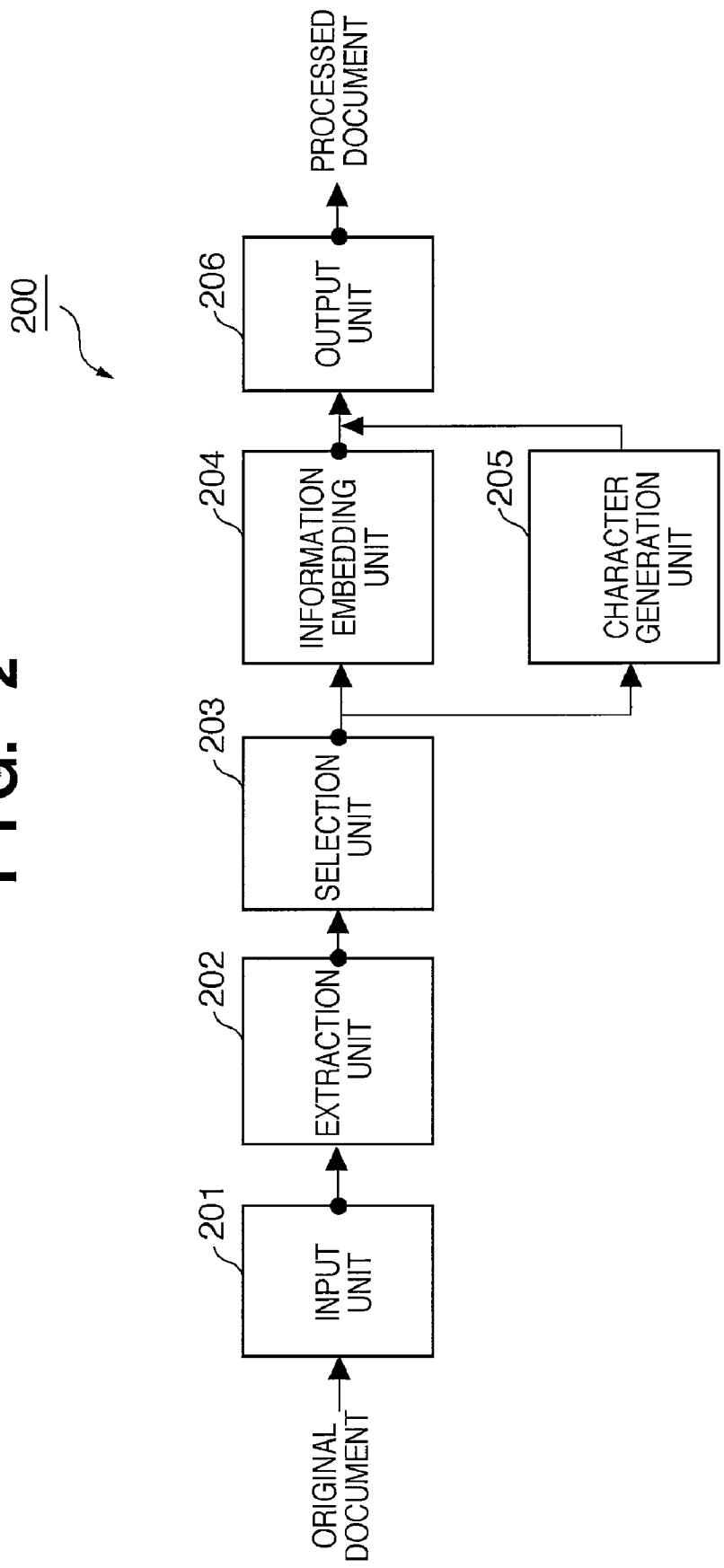
FIG. 2 is a block diagram showing the functional arrangement of an information embedding apparatus 200 according to the first embodiment.

The PC 101 has a basic functional unit which performs general processes such as calculation, display, and input/output, and various functional units shown in FIG. 2. A driver for controlling the printer function, scanner function, and like of the MFP 102, and application software for creating a document are installed in advance in the PC 101. Note that the present invention is applicable to dedicated document generation application software, widely distributed document creation application software, plug-in software of form creation software, and the like. Functions according to the present invention can also be incorporated in a driver. The number of PCs 101 is not limited to one, and a plurality of PCs 101 may also be connected to a network.

The MFP 102 has a basic functional unit having multiple functions such as a copy function, scan function, print function, and image processing function, a scanner unit which scans a document, and a printer unit which prints on a paper medium to output a printed material.

The information processing apparatus 100 according to the present invention comprises an information embedding apparatus 200 which embeds information in a document, or an information extraction apparatus 800 which extracts information embedded by the information embedding apparatus 200. These apparatuses are connected to a network to build an information processing system.

[Arrangement and Processing of Information Embedding Apparatus 200]

FIG. 2 is a block diagram showing the functional arrangement of the information embedding apparatus 200 according to the first embodiment. The information embedding apparatus 200 comprises an input unit 201, extraction unit 202, selection unit 203, information embedding unit 204, character generation unit 205, and output unit 206.

The input unit 201 is a function of inputting an original document by reading it by a scanner or the like. An original document stored in advance in the PC 101 may also be loaded. The extraction unit 202 is a function of embedding information in each character in an original document, and extracting the circumscribed rectangle of each character from the original document. The selection unit 203 is a function of selecting a character in which information is to be embedded, from characters included in respective circumscribed rectangles based on a predetermined condition.

The information embedding unit 204 is a function of embedding information in a character selected by the selection unit 203 as a character in which information is to be embedded. The character generation unit 205 is a function of generating a character not selected by the selection unit 203 at a lower pixel density per unit area than that of a character in which the information embedding unit 204 embeds information. That is, the selection unit 203 is a function of selecting whether each character extracted by the extraction unit 202 is a character in which the information embedding unit 204 is to embed watermark information or a character to be generated at low pixel density per unit area by the character generation unit 205. The output unit 206 is a function of outputting an original document (to be also referred to as a processed document hereinafter) processed by the information embedding unit 204 and character generation unit 205. In the following description, a character generated by the character generation unit 205 at low pixel density per unit area is also called a small dot character.

Figure 3:
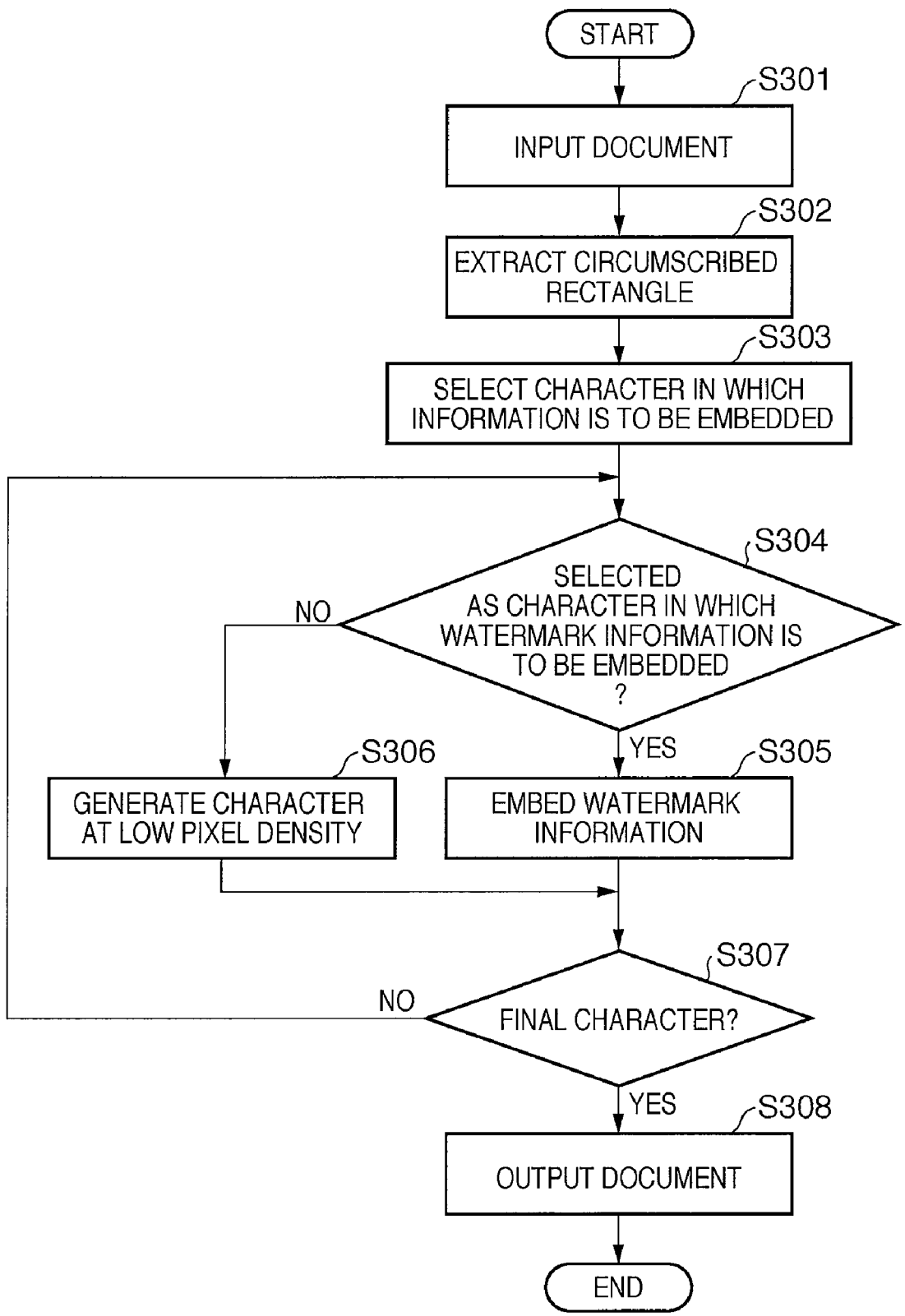
FIG. 3 is a flowchart showing the operation procedures of the information embedding apparatus 200.
Figure 4:
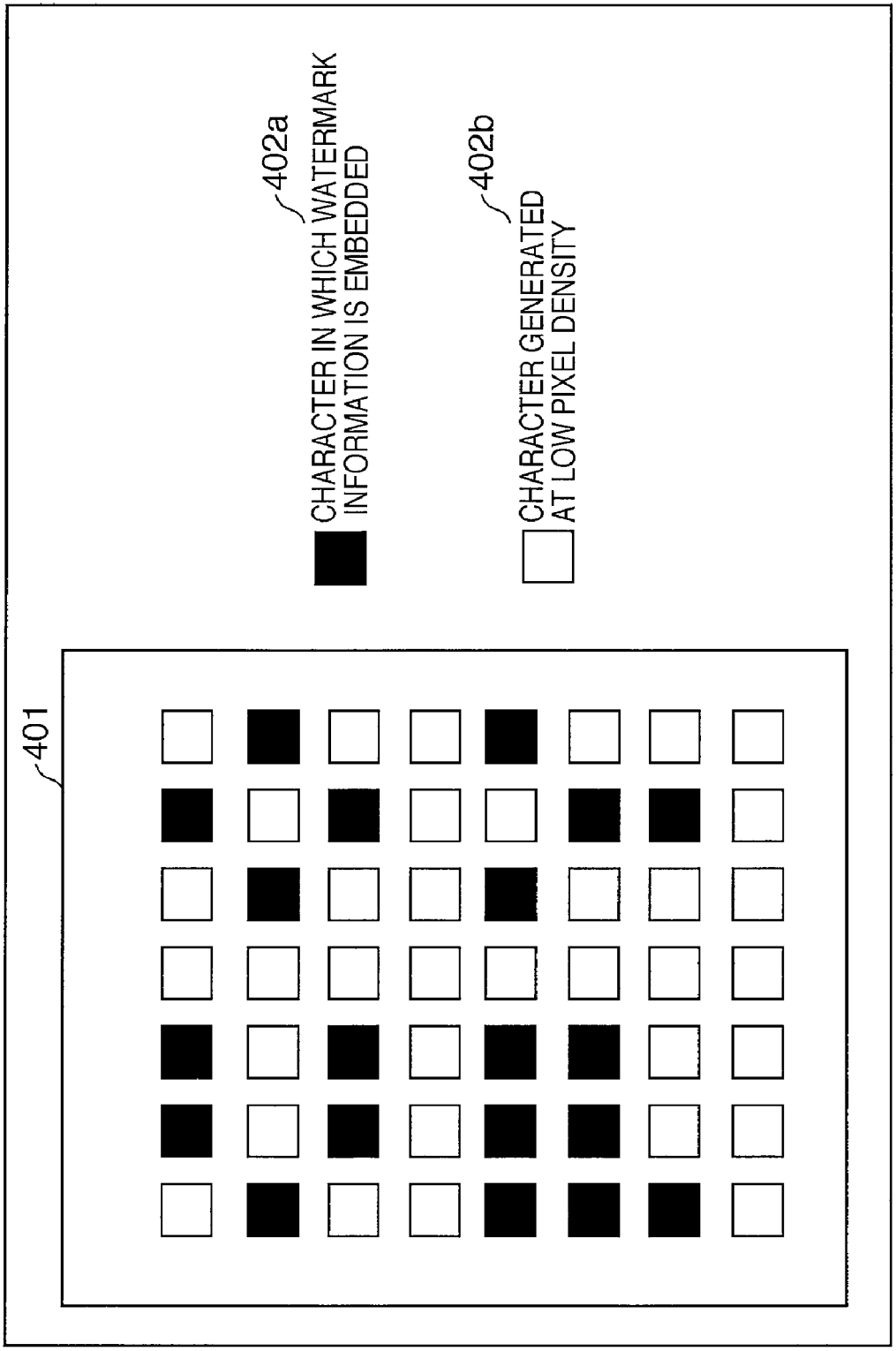
FIG. 4 is a view showing an example of a mask pattern image.
Figure 5:
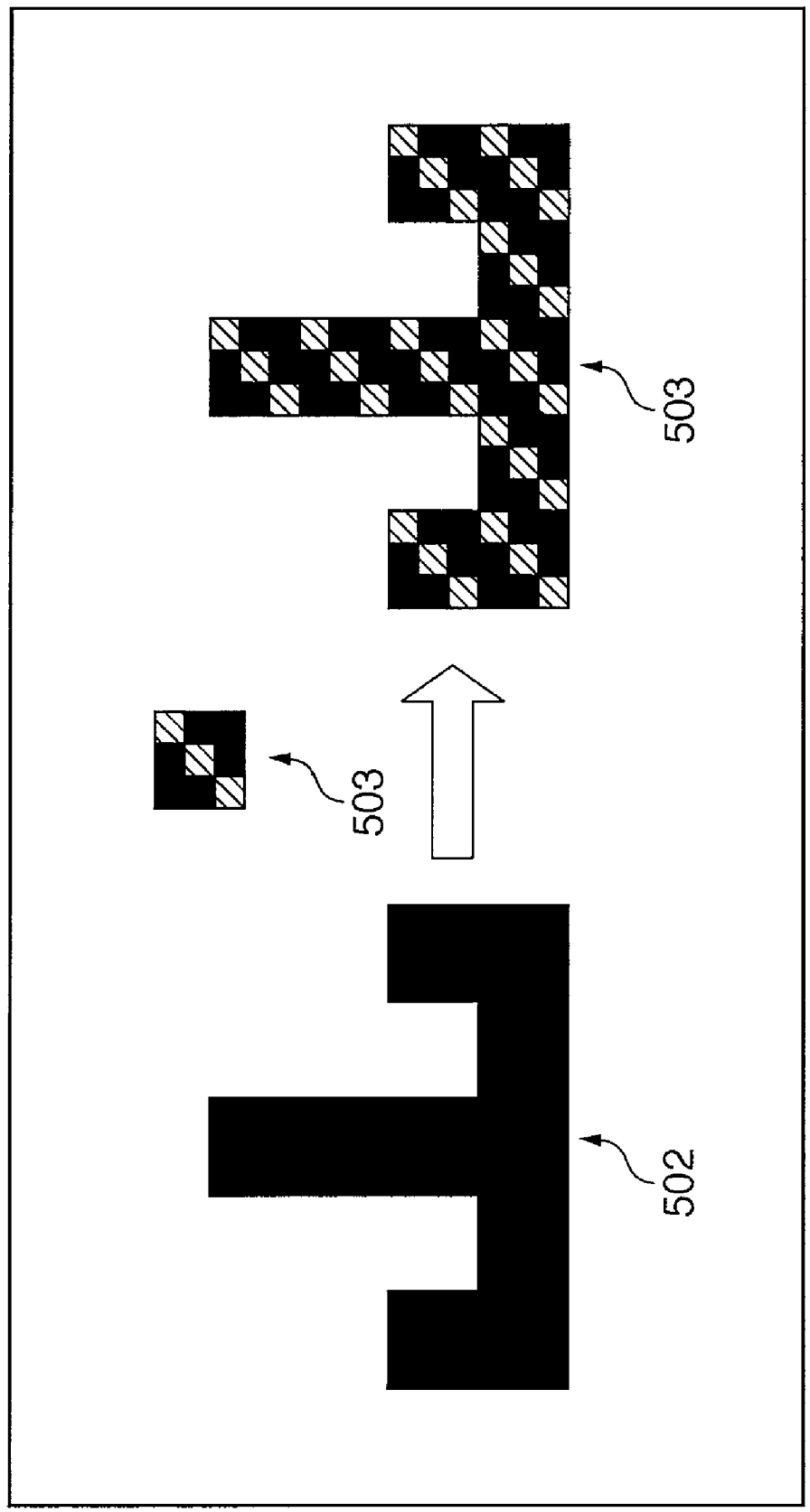
FIG. 5 is a view showing an example of a character formed from a dot pattern.

FIG. 3 is a flowchart showing the operation procedures of the information embedding apparatus 200. FIG. 4 is a view showing an example of a mask pattern image. FIG. 5 is a view showing an example of a character formed from a dot pattern.

In step S301, the input unit 201 such as a scanner inputs an original document to be processed. In step S302, the extraction unit 202 extracts a circumscribed rectangle corresponding to a character from the input document. At this time, when the input document is a bitmap image, pieces of information such as the position coordinates, character rectangle size, and the like of each character are sequentially output using a character extraction technique known in the OCR technique. When the input document is described in a page description language of the PDF (Portable Document Format) or the like, coordinate information of each character, character code information, and the like are extracted from a PDF file and sequentially output.

In step S303, the selection unit 203 selects a character in which information is to be embedded, from characters included in respective circumscribed rectangles based on the circumscribed rectangle information extracted in step S302 and a predetermined condition. More specifically, after generating an image representing the correspondence between a position in the input document and a character (or character rectangle), it is sequentially determined for respective pixels based on a predetermined condition whether to embed watermark information or generate a character at low pixel density per unit area.

Note that the predetermined condition can be a condition to select, at random, characters in which watermark information is to be embedded, or a condition to select characters from a character string in a predetermined cycle (e.g., every 11th character). The condition to select a character in which information is to be embedded may also be set to form a design image from characters generated at low pixel density within an area including characters in which the information embedding unit embeds information.

As shown in FIG. 4, characters extracted by the extraction unit 202 are arrayed as circumscribed rectangles 402 in a document image 401. Each circumscribed rectangle 402 represents the rectangle position and size of each character. The circumscribed rectangle 402 is selected based on a predetermined condition. A filled rectangle 402a represents a character in which watermark information is embedded, and a blank rectangle 402b represents a character formed from small dots. In this case, for example, the predetermined condition is to present "CO" on the upper stage and "PY" on the lower stage. That is, the condition can be set to arrange the filled rectangles 402a and blank rectangles 402b so as to form a word "COPY" from a character array in which watermark information is embedded in a document image.

More specifically, a design image such as "COPY" or "COPY PROTECTED" is stored as a mask pattern base. Based on the design image and character layout, a mask pattern in FIG. 4 is generated. At this time, the user may also freely select and create the design image every time a mask pattern is generated. The information embedding unit embeds, in a character selected by the selection unit 203, information for controlling at least whether to permit copying. The design image can also be a company name, department name, or the like.

In step S304, it is determined whether the character of interest has been selected in step S303 as a character in which watermark information is to be embedded. If it is determined in step S304 that the character of interest has been selected as a character in which watermark information is to be embedded, the information embedding unit 204 embeds watermark information in step S305.

In the first embodiment, the information embedding unit 204 embeds watermark information in a special dot pattern of a character included in a circumscribed rectangle. The special dot pattern is a dot pattern 501 in FIG. 5, and an original character "⊔" with no information embedded is a character 502. The character 502 and dot pattern 501 are composited into a character 503. In this manner, a character is processed to embed information.

The number of dot patterns is not limited to one, and a plurality of patterns may also be prepared to increase the embedded information amount per character in accordance with the extraction performance and application purpose. The type of embedded information is not limited to information representing illicit copy protection. Instead, information representing the record of a printed document such as the name of a user who printed, the device ID of an MFP (or printer) used to print, and the date and time may also be embedded.

If it is determined in step S304 that the character of interest has not been selected as a character in which watermark information is to be embedded, the character generation unit 205 generates in step S306 the character not selected by the selection unit 203 at a pixel density lower than that of a character in which the information embedding unit 204 embeds information.

Figure 6:
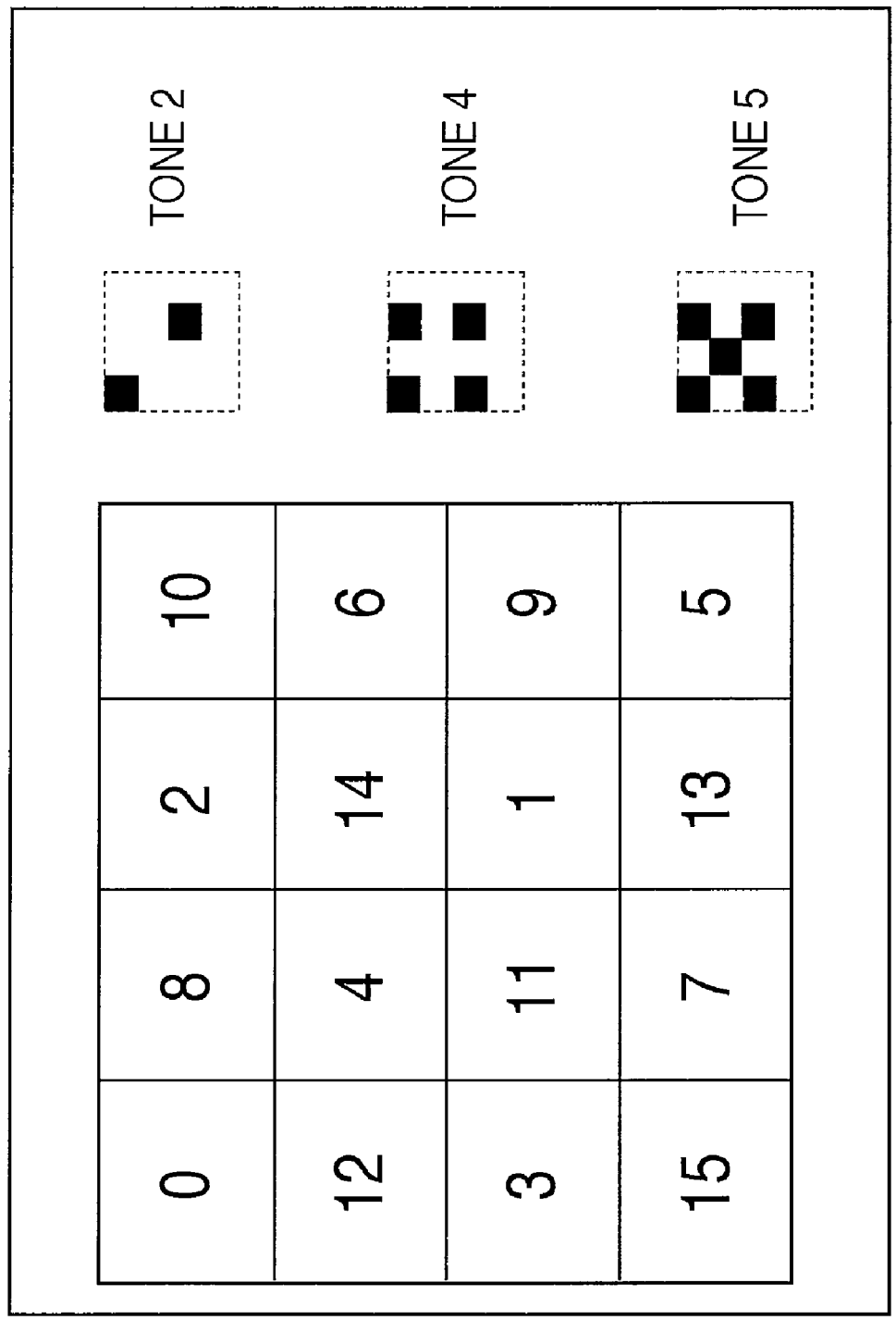
FIG. 6 is a view showing an example of a dispersed-dot dither matrix.
Figure 7:
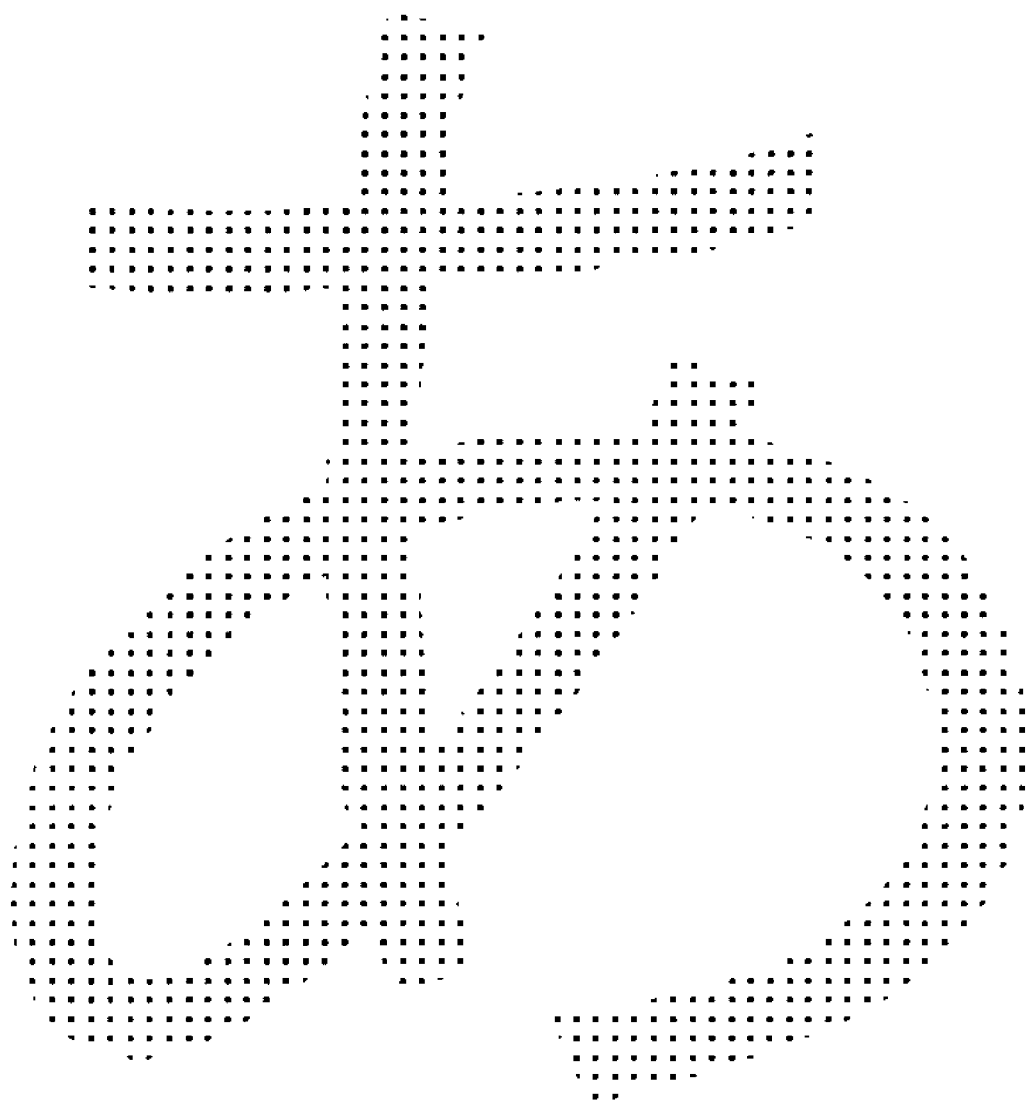
FIG. 7 is a view showing an example of a character formed from small dots.

The process of step S306 will be explained with reference to FIGS. 6 and 7. FIG. 6 is a view showing an example of a dispersed-dot dither matrix. FIG. 7 is a view showing an example of a character formed from small dots. A character included in a circumscribed rectangle is generated at low pixel density per unit area such that dots are dispersedly arranged using a dispersed-dot dither matrix shown in FIG. 6 which is known in the copy forgery inhibition technique, and a character disappears upon undercolor removal processing in copying. One entire character is formed by repeating the dither matrix, generating a character with pixels at low density, as shown in FIG. 7.

Finally in step S307, it is determined whether the character of interest is the final character. If it is determined in step S307 that the character of interest is the final character, the output unit 206 outputs in step S308 a document (processed document) in which each character image of the input document has undergone processing of embedding watermark information, or processing of generating pixels per unit area at low density. That is, an illicit copy-protected document generated by the PC 101 in the above-described way is output as a paper document by the printer of the MFP 102 via a driver, as shown in FIG. 1. If it is determined in step S307 that the character of interest is not the final character, the process is repeated from step S304 for characters subsequent to the character of interest.

In the first embodiment, an illicit copy-protected document obtained by embedding watermark information in an "electronic" original document is output using paper media. Alternatively, it is also possible to arrange the functions shown in FIG. 2 in the MFP 102 itself, scan a "paper" original document by the MFP 102, process the obtained data in the MFP 102, and output the data on paper media using a printer.

The first embodiment adopts a method (dot pattern method) of embedding watermark information by giving regularity to a dot pattern which forms a character. However, the present invention is not limited to the dot pattern method, and can employ a variety of information embedding methods such as a method of changing the character or line spacing to embed watermark information, and a method of inclining a character rectangle to embed information.

[Arrangement and Processing of Information Extraction Apparatus 800]

Figure 8:
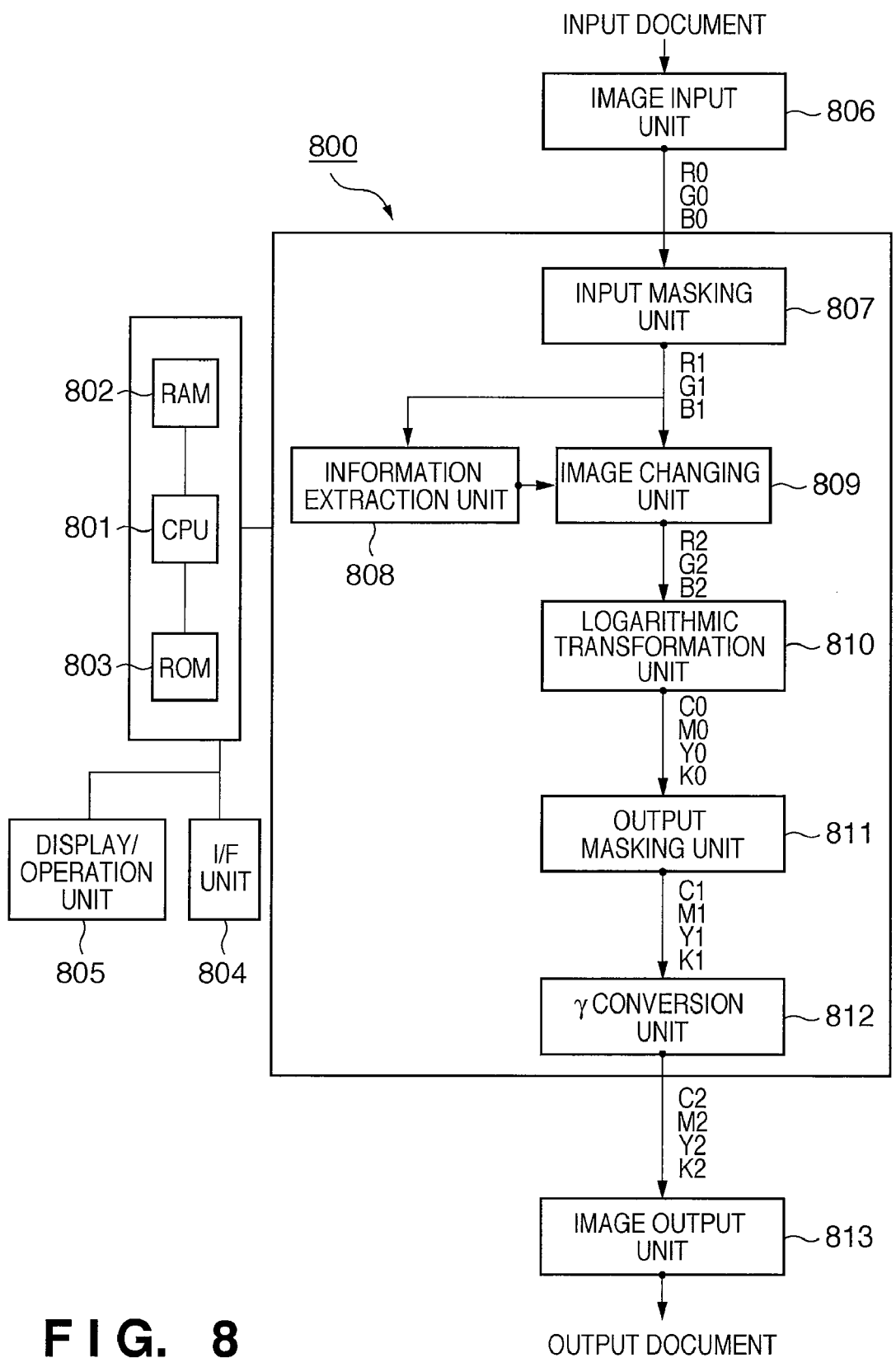
FIG. 8 is a block diagram showing the functional arrangement of an information extraction apparatus 800 according to the first embodiment.

FIG. 8 is a block diagram showing the functional arrangement of the information extraction apparatus 800 according to the first embodiment. A CPU 801 controls the MFP 102 using programs and data stored in a RAM 802 and ROM 803. The RAM 802 has an area for temporarily storing programs and data, and an area necessary to perform various processes by the CPU 801. The ROM 803 stores the functional programs, setting data, and the like of the MFP. An I/F (interface) unit 804 includes various I/Fs for network connection via a LAN or the like, serial connection, and the like. A display/operation unit 805 includes a control processor for displaying a character, image, and the like, a display, and an operation panel.

The information extraction apparatus 800 comprises an image input unit 806, input masking unit 807, information extraction unit 808, image changing unit 809, logarithmic transformation unit 810, output masking unit 811, γ conversion unit 812, and image output unit 813.

The image input unit 806 inputs a document image generated by the above-described information embedding apparatus 200. The image input unit 806 is a color scanner which converts the color components of a read input paper document into image data of R (Red), G (Green), and B (Blue) signals. The image output unit 813 outputs a document or image on paper. The type of printer includes, for example, an inkjet printer, laser beam printer, thermal printer, and dot impact printer.

The input masking unit 807 converts R, G, and B signals R0, G0, and B0 transmitted from the image input unit 806 into R1, G1, and B1 corresponding to the scanner characteristic. An input masking coefficient necessary for conversion is set in advance and stored in the ROM 803.

The information extraction unit 808 extracts information embedded in the image input by the image input unit 806. That is, the information extraction unit 808 extracts watermark information embedded in a dot pattern in a document generated by the information embedding apparatus 200.

The image changing unit 809 sets a threshold for the luminance value of an input image based on information extracted by the information extraction unit 808, and changes, into an invisible portion, a portion of the input image that is higher in luminance than the threshold. For example, the image changing unit 809 uniformly changes such a portion to have the maximum value of a possible luminance value. The image changing unit 809 has a histogram creation unit (not shown) which creates the luminance histogram of an input image, and a threshold setting unit (not shown) which sets a threshold under a predetermined condition.

When the information extraction unit 808 has extracted information, the threshold setting unit sets, as a threshold, a luminance value corresponding to a trough between the peak of the second highest luminance value and that of the highest luminance value among three peaks appearing in the luminance histogram. When the information extraction unit 808 has not extracted information, the threshold setting unit sets the minimum value of a possible luminance value as a threshold.

When copying a colored paper document, newspaper, or the like, the image changing unit 809 may also simultaneously perform processing (undercolor removal processing) of properly removing the background color to clearly print only the contents such as a text. For example, a histogram creation unit can generate a luminance histogram, detect the signal level of the undercolor (background) of a document image based on the luminance histogram, set an appropriate threshold, and remove the undercolor from the image.

The logarithmic transformation unit 810 generates C (Cyan), M (Magenta), and Y (Yellow) data serving as print color components from a document image having undergone the change processing by the image changing unit 809. The logarithmic transformation unit 810 performs processing using a lookup table corresponding to a logarithmic transformation constant stored in the ROM 803 or an input signal. Then, the logarithmic transformation unit 810 performs black extraction processing (e.g., UCR processing) to generate a black component K0, and also removes a few tens of percentage of the component K0 to generate C0, M0, and Y0.

The output masking unit 811 executes masking calculation considering the color reproducibility range of the printer. The γ conversion unit 812 generates C2, M2, Y2, and K2 using a γ correction table stored in the ROM 803. The image output unit 813 outputs the image changed by the image changing unit 809 after performing various data processes described above.

Figure 9:
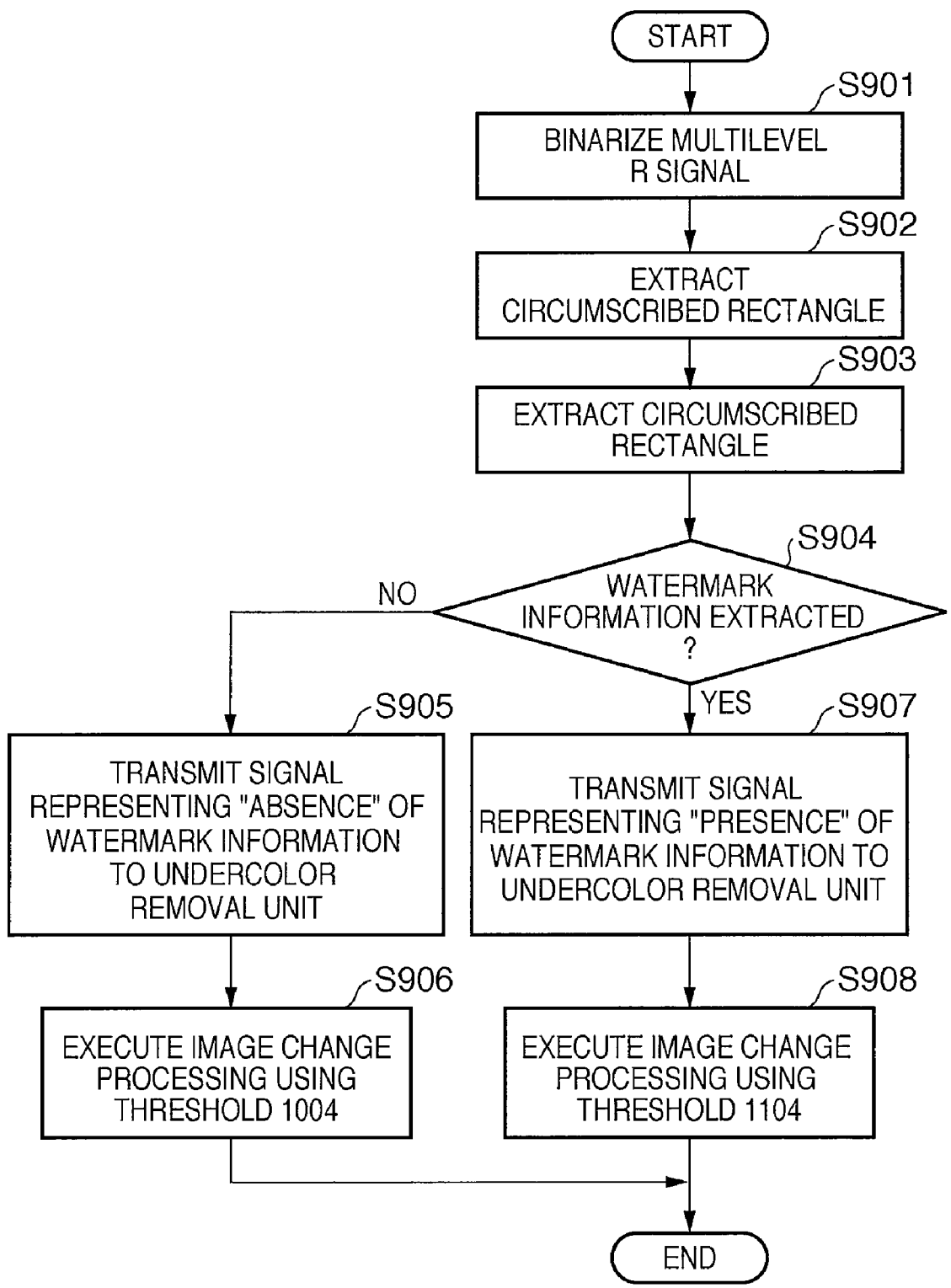
FIG. 9 is a flowchart showing the operation procedures of an information extraction unit 808 and image changing unit 809.

FIG. 9 is a flowchart showing the operation procedures of the information extraction unit 808 and image changing unit 809. In step S901, the information extraction unit 808 binarizes an input multilevel (e.g. 8-bit) R signal in order to greatly reduce the amount of calculation of watermark information extraction and the work memory. Since a document generated by the information embedding apparatus 200 contains watermark information embedded in black characters, watermark information can also be extracted not only from an R signal but also from G and B signals. In the first embodiment, however, watermark information is extracted from an R signal.

When watermark information is embedded not only in black characters but also in color characters of red, blue, or the like according to specifications, it is necessary to try to extract watermark information from a B signal other than an R signal, and if necessary, from all R, G, and B signals so as to extract watermark information from even color characters.

In step S902, the information extraction unit 808 cuts out each character and extracts a circumscribed rectangle based on the binary image data by using a known OCR technique, similar to a case where watermark information is embedded.

In step S903, a character included in each extracted circumscribed rectangle is correlated with the dot pattern 501 shown in FIG. 5 serving as an original image used to embed watermark information. More specifically, when the document contains the character 503 shown in FIG. 5, a peak appears as a result of calculating the cross-correlation. In step S903, it can be detected that the document contains watermark information. To increase the processing speed, the process may shift to the next step upon detecting watermark information. However, when watermark information is embedded as information representing the record of a printed document, as described above, all pieces of watermark information are extracted.

In step S904, it is determined whether watermark information has been extracted from the document. If it is determined in step S904 that no watermark information has been extracted, a signal representing the "absence" of watermark information is transmitted to the image changing unit 809 in step S905.

Figure 10:
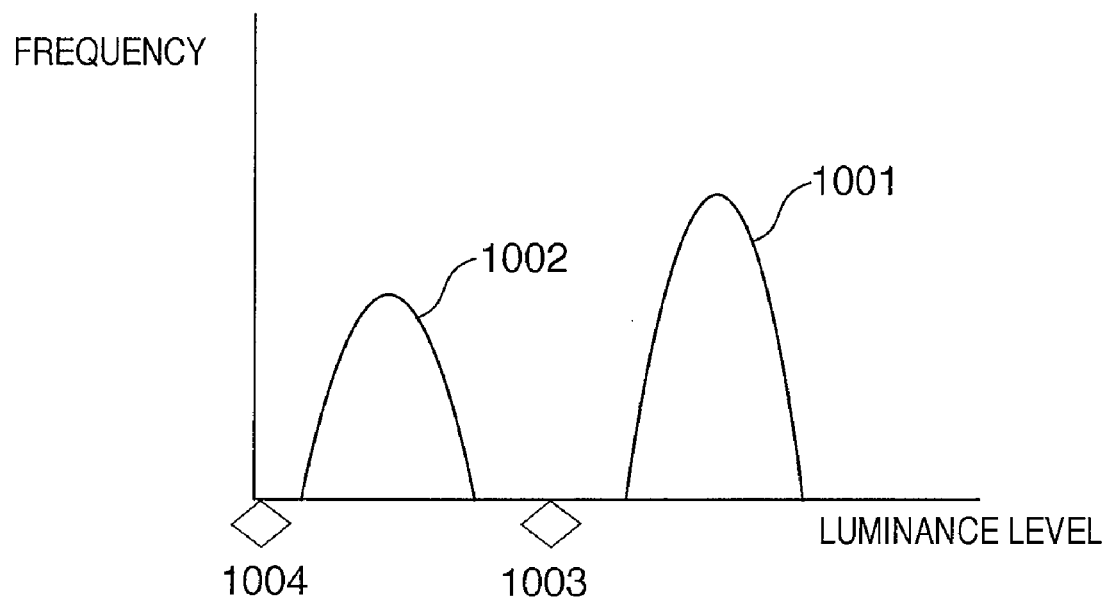
FIG. 10 is a graph showing the luminance histogram of a general document.
Figure 11:
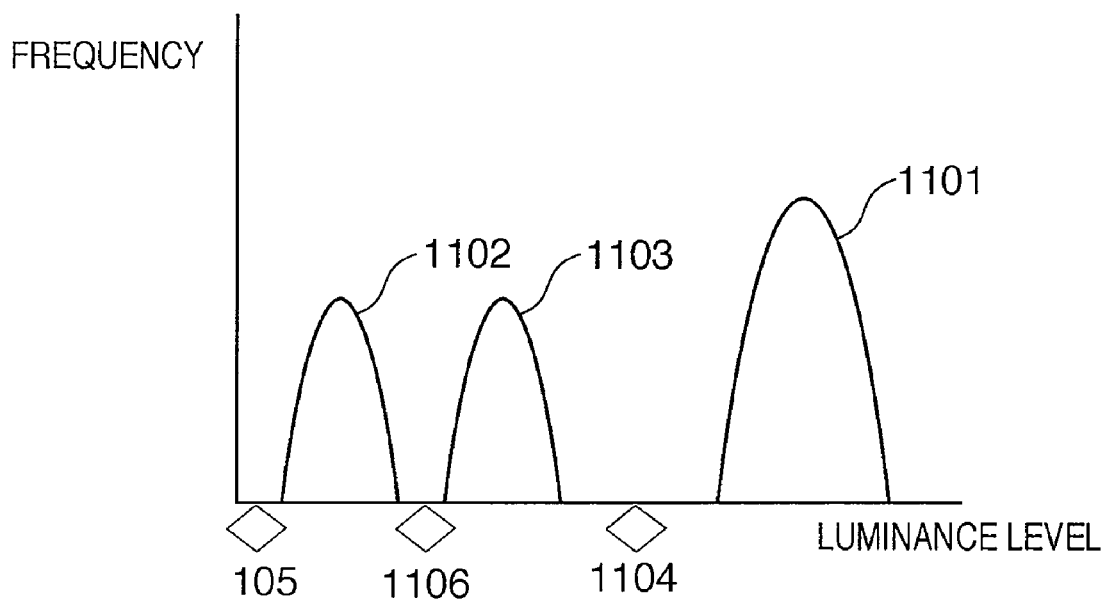
FIG. 11 is a graph showing the luminance histogram of an illicit copy-protected document.

The luminance histograms of a general document and watermark information-embedded document according to the present invention will be explained with reference to FIGS. 10 and 11. FIG. 10 is a graph showing the luminance histogram of a general document. FIG. 11 is a graph showing the luminance histogram of a watermark information-embedded document.

The histogram creation unit of the image changing unit 809 generates the luminance histogram of an input image signal, as shown in FIGS. 10 and 11. As shown in FIG. 10, a quadratic curve 1001 is obtained by extracting the background (white part for white paper) of a document, and a quadratic curve 1002 is obtained by extracting black characters.

As shown in FIG. 11, a quadratic curve 1101 is obtained by extracting the background of a document, a quadratic curve 1102 is obtained by extracting characters in which watermark information generated with a dot pattern is embedded, and a quadratic curve 1103 is obtained by extracting characters generated at low pixel density per unit area. That is, a document determined not to have watermark information exhibits a luminance histogram as shown in FIG. 10. A document determined to have watermark information exhibits a luminance histogram as shown in FIG. 11.

Referring back to the flowchart of FIG. 9, in step S906, even a character image is removed using a threshold 1004 as the threshold of image change processing in order to inhibit copying (this image is defined as A).

If it is determined in step S904 that watermark information has been extracted, a signal representing the "presence" of watermark information is transmitted to the image changing unit 809 in step S907. In the first embodiment, a document from which watermark information is extracted is a document which permits copying. For this reason, in step S908, the threshold setting unit of the image changing unit 809 sets, as a threshold 1104, a luminance value corresponding to a trough between the peak of the second highest luminance value and that of the highest luminance value among three peaks appearing in the luminance histogram. After that, image processing is done to remove an image having a luminance value larger than the threshold 1104 (this image is defined as B).

By the above-described processing, when no watermark information has been extracted, a document image is output as image A to print nothing on paper, forcibly preventing illicit copying. When watermark information has been extracted, a document image which is faithful to an input image and reproduces watermark information-embedded characters and characters generated at low pixel density per unit area is output as image B. Thus, a document can be faithfully reproduced for legal copying.

An MFP (so-called legacy machine) to which the present invention is not applied has a function of regarding, as an undercolor, a portion higher in luminance than a black character and lower than a character formed from a dot pattern, and erasing the portion, in order to execute undercolor removal processing. In the legacy machine, the threshold is fixed, and cannot be changed, unlike the present invention. More specifically, characters (characters in blank rectangles shown in FIG. 4) generated at low pixel density per unit area are erased as an undercolor. A conventional problem is that, although copying is inhibited, a legacy machine can normally copy a document image in which an information embedding apparatus embeds watermark information. To solve this problem, according to the present invention, the threshold changes to a threshold 1003 shown in FIG. 10 when no watermark information is embedded, and to a threshold 1106 shown in FIG. 11 when watermark information is embedded.

Hence, a document image generated using the information embedding apparatus 200 of the present invention is made up of characters formed from a dot pattern and characters generated at low pixel density per unit area. When this document image is copied by a legacy machine, it cannot be faithfully reproduced.

When the present invention is implemented by an arrangement similar to that of a legacy machine, an undercolor removal processing unit (not shown) is arranged after the input masking unit 807 in FIG. 8. That is, a document is scanned, and a document having undergone undercolor removal processing (document processed using the threshold 1106 in FIG. 11) is input to the information extraction unit 808 on the output side of the undercolor removal processing unit (not shown). The information extraction unit 808 tries to extract watermark information from the document, and if it extracts watermark information, an image has already been omitted from the document. Thus, the document is scanned again by the image input unit 806. The document, which skips, that is, bypasses the undercolor removal processing unit via the input masking unit 807, is processed by the image changing unit 809 using the threshold 1104 in FIG. 11. As a result, a document image which is faithful to an input image and reproduces watermark information-embedded characters and characters generated at low pixel density per unit area, similar to image B, is output. A document can be faithfully reproduced for legal copying.

To the contrary, if the information extraction unit 808 has not extracted watermark information, the first document is processed by the image changing unit 809 using the threshold 1004 in FIG. 10 without scanning the document again. Similar to image A, a document image is output to print nothing on paper, forcibly preventing illicit copying.

According to this arrangement, a document containing no watermark information is scanned only once, and a watermark information-embedded document is scanned twice. To increase the speed of a series of processes to scan and scan again, it is also possible to divide a document into a plurality of blocks in the first scanning, try to extract watermark information from each block, if watermark information is extracted from a given block, stop the extraction processing, and shift to re-scanning.

As described above, the first embodiment can more reliably prevent illicit copying, and allows accurate, easy copying of a document for legal copying.

In the first embodiment, the threshold setting unit of the image changing unit 809 sets a threshold to forcibly erase an image higher in luminance than the threshold and present the resultant document. However, the present invention is not limited to this processing. For example, a portion corresponding to a circumscribed rectangle may also be forcibly output in gray (so-called grayout). Alternatively, a portion corresponding to a circumscribed rectangle may also be changed into a blank portion to output a blank sheet.

A character generated at low pixel density per unit area may also have a pixel density enough to set the luminance value to be larger than a threshold used to perform undercolor removal in a general legacy machine.

Modification to First Embodiment

The first embodiment controls to permit copying when watermark information has been extracted from an original document, and inhibit copying when no watermark information has been extracted. The modification is different from the first embodiment in that copying is inhibited when watermark information has been extracted from an original document, and permitted when no watermark information has been extracted. The modification is different from the first embodiment only in the processes of steps S906 and S908, and a description of the same processes will not be repeated.

If it is determined in step S904 that no watermark information has been extracted, a signal representing the "absence" of watermark information is transmitted to the image changing unit 809 in step S905. In step S906, the threshold setting unit sets, as a threshold, a luminance value corresponding to a trough between two peaks appearing in the luminance histogram. In other words, the threshold 1003 is used to leave characters and remove only the background in order to permit copying, as shown in FIG. 10 (this image is defined as A').

If it is determined in step S904 that watermark information has been extracted, a signal representing the "presence" of watermark information is transmitted to the image changing unit 809 in step S907. In step S908, the threshold setting unit sets the minimum value of a possible luminance value as a threshold. Since copying is "inhibited", a threshold 1105 is set to execute image change processing, as shown in FIG. 11 (this image is defined as B'). Accordingly, an image from which watermark information-embedded characters and characters generated at low pixel density per unit area are erased is output. The subsequent process is the same as that in the first embodiment.

As a result of this process, a document image which is faithful to a scanned image and accurately reproduces characters is output as image A'. As image B', a document image is output to print nothing on paper.

When a so-called legacy machine copies a document in which the information embedding apparatus 200 embeds watermark information, the luminance histogram shown in FIG. 11 is obtained, the threshold 1106 is set as the threshold of the luminance value, and general undercolor removal processing is done. A document in which characters made up of small dots are removed and watermark information-embedded characters remain is output. Since only watermark information-embedded characters (characters in filled rectangles shown in FIG. 4) remain and characters generated at low pixel density (characters in blank rectangles in FIG. 4) are removed, a word "COPY" appears in the document. Thus, even a legacy machine can explicitly indicate that the copied document is an illicitly copied one, and can prevent copying of a document identical to an original one.

As described above, similar to the first embodiment, the modification can more reliably prevent illicit copying, and allows accurate, easy copying of a document for legal copying.

In the first embodiment, illicit copy protection processing in the MFP 102 is always executed. However, the display/operation unit 805 may also allow the user to select, as a mode, a "normal copy mode" and an "illicit copy protection mode" in which the processing of the present invention is executed.

Second Embodiment

Figure 12:
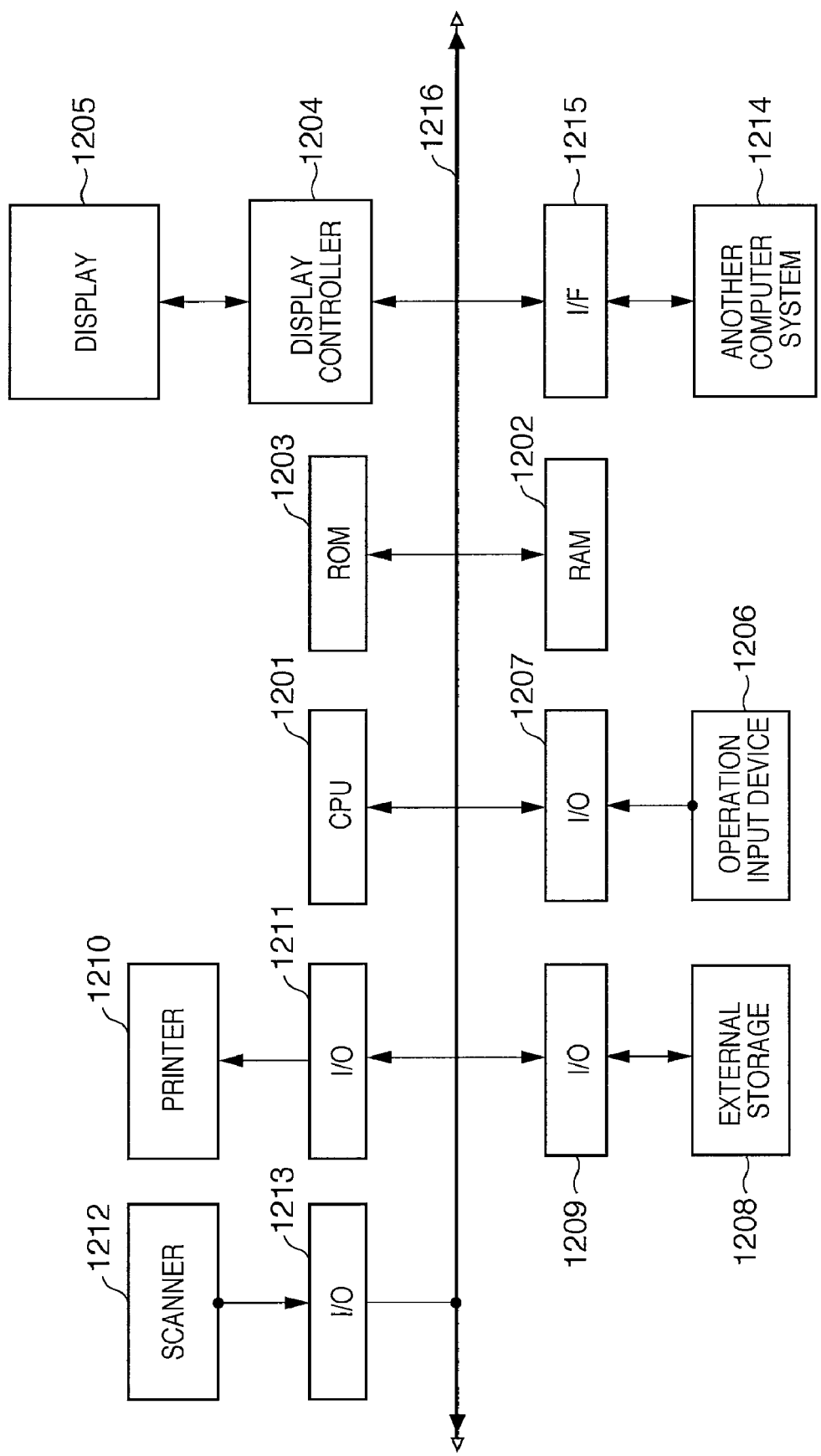
FIG. 12 is a block diagram of the basic arrangement of a computer according to the second embodiment.

The MFP 102 performs various processes in the first embodiment, but a computer executes them in the second embodiment. FIG. 12 is a block diagram of the basic arrangement of a computer according to the second embodiment.

In the second embodiment, the computer executes all functions except those of a scanner and printer in the first embodiment. In this case, a program expresses each functional arrangement and is loaded into the computer, implementing all functions except those of a scanner and printer in the first embodiment.

A CPU 1201 controls the overall computer by using programs and data stored in a RAM 1202 and ROM 1203, and performs processes described in the first embodiment.

The RAM 1202 has an area for temporarily storing programs and data loaded from an external storage 1208, and those downloaded from another computer system 1214 via an I/F (interface) 1215. The RAM 1202 also has an area necessary to perform various processes by the CPU 1201.

The ROM 1203 stores the functional programs, setting data, and the like of the computer. A display controller 1204 performs control processing to display an image, character, and the like on a display 1205. The display 1205 displays an image, character, and the like. As the display, a CRT, liquid crystal display, or the like is applicable.

An operation input device 1206 includes devices such as a keyboard and mouse capable of inputting various instructions to the CPU 1201. An I/O 1207 notifies the CPU 1201 of various instructions and the like input via the operation input device 1206.

The external storage 1208 functions as a large-capacity storage such as a hard disk, and stores a program for causing the CPU 1201 to execute processes according to the embodiments, input/output document images, and the like. Information is written in the external storage 1208 or read out from it via an I/O 1209.

A printer 1210 outputs a document or image, and the output data is transmitted from the RAM 1202 or external storage 1208 via an I/O 1211. As the printer 1210, an inkjet printer, laser beam printer, thermal printer, dot impact printer, and the like are available.

A scanner 1212 scans a document or image, and the input data is transmitted to the RAM 1202 or external storage 1208 via an I/O 1213.

A bus 1216 connects the CPU 1201, ROM 1203, RAM 1202, I/O 1211, I/O 1209, display controller 1204, I/F 1215, I/O 1207, and I/O 1213.

In the second embodiment, the computer performs processes except those by a scanner and printer. Alternatively, a dedicated hardware circuit in the scanner or printer may also be used to perform processes in place of the computer.

The above-described embodiments are merely concrete examples of practicing the present invention, and the technical scope of the present invention should not be interpreted within the description of the embodiments. The present invention can be practiced in a variety of forms without departing from the technical idea and principal features of the invention.

Other Embodiments

The embodiments may also be applied to a system including a plurality of devices (e.g., a host computer, interface device, reader, and printer), or an apparatus (e.g., a copying machine, multi-function peripheral, or facsimile apparatus) formed by a single device.

The present invention may also be applied by supplying a computer-readable storage medium (or recording medium) which stores the computer program codes of software for implementing the functions of the above-described embodiments to a system or apparatus. The present invention may also be applied by reading out and executing the program codes stored in the recording medium by the computer (or the CPU or MPU) of the system or apparatus. In this case, the program codes read out from the recording medium implement the functions of the above-described embodiments, and the recording medium which records the program codes constitutes the embodiments. Also, the present invention includes a case where an OS (Operating System) or the like running on the computer performs some or all of actual processes based on the instructions of the program codes and thereby implements the functions of the above-described embodiments.

The present invention also includes a case where the program codes read out from the recording medium are written in the memory of a function expansion card inserted into the computer or the memory of a function expansion unit connected to the computer, and the CPU of the function expansion card or function expansion unit performs some or all of actual processes based on the instructions of the program codes and thereby implements the functions of the above-described embodiments.

When the embodiments are applied to the computer-readable storage medium, the storage medium stores computer program codes corresponding to the above-described flowcharts and functional arrangements.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-264970 filed Oct. 10, 2007, which is hereby incorporated by reference herein in its entirety.

What is claimed is:

1. An information processing apparatus which embeds information in each character in an original document, the apparatus comprising:
   extraction unit for extracting circumscribed rectangles of characters from the original document;
   selection unit for selecting, based on a predetermined condition, a character in which information is to be embedded, from the characters included in the respective circumscribed rectangles;

information embedding unit for embedding information in a character selected by the selection unit as the character in which information is to be embedded;

character generation unit for generating a character not selected by the selection unit at a lower pixel density per unit area than a pixel density of the character in which the information embedding unit embeds the information; and output unit for outputting the original document processed by the information embedding unit and the character generation unit.

2. The apparatus according to claim 1, wherein the information embedding unit embeds information in a dot pattern of the character included in the circumscribed rectangle.

3. The apparatus according to claim 1, wherein the character generation unit uses a dither matrix.

4. The apparatus according to claim 1, wherein the information embedding unit embeds, in the character selected by the selection unit, information for controlling at least whether to permit copying.

5. The apparatus according to claim 1, wherein the predetermined condition includes a condition to select characters in which information is to be embedded, so as to form a design image from characters generated at low pixel density within an area including characters in which the information embedding unit embeds information.

6. The apparatus according to claim 1, wherein the predetermined condition includes one of a condition to select, at random, characters in which information is to be embedded, and a condition to select characters from a character string in a predetermined cycle.

7. An information processing apparatus comprising:

image input unit for inputting an image output from the output unit defined in claim 1;

extraction unit for extracting information embedded in the image input by the image input unit;

image changing unit for setting a threshold for a luminance value of the input image on the basis of the information extracted by the extraction unit, and changing, into an invisible portion, a portion of the input image that is higher in luminance than the threshold; and image output unit for outputting the image changed by the image changing unit.

8. The apparatus according to claim 7, wherein the image changing unit comprises histogram creation unit for creating a luminance histogram of the input image, and threshold setting unit for, when the extraction unit has extracted the information, setting, as the threshold, a luminance value corresponding to a trough between a peak of a second highest luminance value and a peak of a highest luminance value among three peaks appearing in the luminance histogram, and when the extraction unit has not extracted the information, setting a minimum value of a possible luminance value as the threshold.

9. The apparatus according to claim 7, wherein the image changing unit comprises histogram creation unit for creating a luminance histogram of the input image, and threshold setting unit for, when the extraction unit has extracted the information, setting a minimum value of a possible luminance value as the threshold, and when the extraction unit has not extracted the information, setting, as the threshold, a luminance value corresponding to a trough between two peaks appearing in the luminance histogram.

10. An information processing method of embedding information in each character in an original document, the method comprising:

an extraction step of extracting circumscribed rectangles of characters from the original document;

a selection step of selecting, based on a predetermined condition, a character in which information is to be embedded, from the characters included in the respective circumscribed rectangles;

an information embedding step of embedding information in a character selected in the selection step as the character in which information is to be embedded;

a character generation step of generating a character not selected in the selection step at a lower pixel density per unit area than a pixel density of the character in which the information is embedded; and an output step of outputting the original document processed in the information embedding step or the character generation step.

11. A non-transitory computer-readable storage medium storing a computer program which is read and executed by a computer to cause the computer to function as an information processing apparatus defined in claim 1.

* * * * *